(No Model.)
G. F. DAY & W. HUNTER.
MUD AND OIL TRAP AND WATER PURIFIER.
No. 520,670. Patented May 29, 1894.
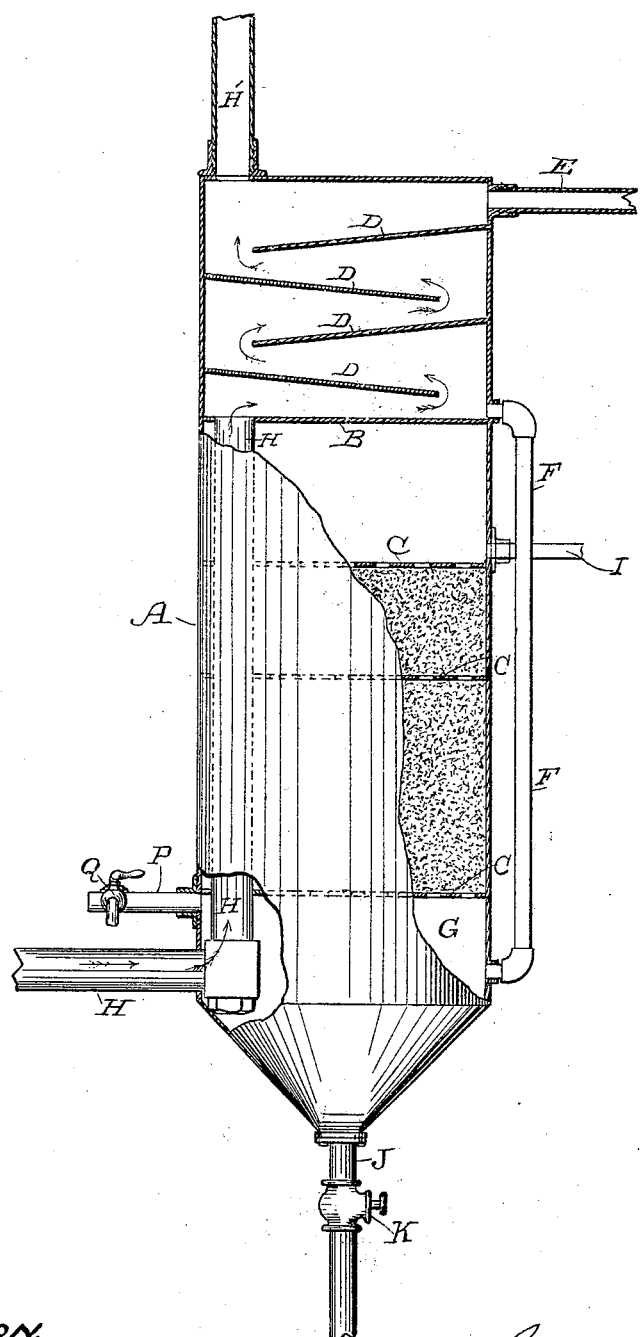
Witnesses,
Inventors,
George F. Day.
William Hunter
By Dewey & Co.
Attys

UNITED STATES PATENT OFFICE.

GEORGE F. DAY AND WILLIAM HUNTER, OF SAN FRANCISCO, CALIFORNIA.

MUD AND OIL TRAP AND WATER-PURIFIER.

SPECIFICATION forming part of Letters Patent No. 520,670, dated May 29, 1894.

Application filed May 27, 1893. Serial No. 475,782. (No model.)

*To all whom it may concern:*

Be it known that we, GEORGE F. DAY and WILLIAM HUNTER, citizens of the United States, residing in the city and county of San Francisco, State of California, have invented an Improvement in Mud and Oil Traps and Water-Purifiers; and we hereby declare the following to be a full, clear, and exact description of the same.

Our invention relates to a device which we call a mud and oil trap and water purifier.

It consists in certain details of construction which will be more fully explained by reference to the accompanying drawing, in which the figure is a side elevation, with a portion broken away showing the interior of the apparatus.

The object of our invention is to provide an apparatus for heating and purifying water, and especially for withdrawing the mud or sediment which is deposited in the water and in conjunction therewith providing an oil trap, and means for withdrawing the oil which constantly accumulates from the engine, and which if allowed to pass into the boiler produces foaming and other objectionable action.

A is an exterior cylinder or chamber having considerable length vertically. This chamber is divided into compartments by means of horizontal diaphragms B and C C. The upper diaphragm B is situated a sufficient distance below the top of the chamber, and forms an independent upper compartment. Within this compartment are fixed a series of alternating inclined shelves D, the upper one being fixed at such an inclination that water will flow over it in a thin sheet, and be discharged at the lower edge near the opposite side, where it falls upon the second of these inclined plates, and thus passes alternatively from side to side until it reaches the bottom of the chamber. Water is admitted into this chamber and upon the upper edge of the upper shelf through a pipe E. From the lower part of this upper chamber a pipe F leads down into the bottom chamber G so that the water after passing over the inclined shelves B, is delivered directly through this pipe F into the lower chamber G.

H is a pipe through which exhaust steam from the engine is admitted into the chamber above the diaphragm B, either directly, or the pipe may pass, as shown in the drawings, up through the chamber G and the filtering chambers above it, the upper end of the exhaust pipe opening into the upper chamber, so that exhaust steam from the engine is delivered into this chamber at a temperature sufficiently high to raise the temperature of the water passing in thin sheets over these inclined shelves, after which the steam escapes freely through the pipe H' at the top without back pressure to the engine. The lime and mineral matter contained in the water, is deposited upon the shelves in this chamber, and thus prevented from passing into the lower chamber or reaching the boiler. The sediment and loose mud pass down through the pipe F into the chamber G at the bottom.

Above the chamber G are a series of perforated diaphragms C dividing the space below the closed diaphragm B into two or more separate chambers. In the present case we have shown three of these chambers. The two lowermost of the chambers above the chamber G are filled with any suitable compact filtering material, as hay, or other substance by which the sedimentary deposit from the water may be arrested, as the water flows upward from the chamber G.

When the apparatus is in operation, water passes, as previously described, through the pipe E into the upper chamber, and thence flowing over the inclined shelves becomes heated by contact with the exhaust steam passing through the chamber so as to deposit the lime or other scale producing substance in a hard crust upon the shelves from which it is removed from time to time, and is afterward conveyed by the pipe F into the lower chamber G, whence it rises through the perforated plates C by pressure, and the filtering material in the two lowest of these chambers arrests the sedimentary material which has been deposited from the water so that it is retained in the lower chamber G. The clear water passing through the upper perforated plate or diaphragm C reaches an open chamber between this diaphragm C and the diaphragm B, and from thence is taken out to be delivered to the boiler through a pipe I.

The lower part of the chamber G is made conical or funnel-shaped, and has a pipe J with a controlling cock K which may be opened from time to time for the discharge of the contents of the chamber G. By reason of the funnel shape of this chamber, the mud and heavy deposit settles down into the apex in such position as to be readily discharged whenever the cock K is opened. Any oil which arrives in the apparatus from the engine, being carried by the exhaust steam, will flow with the water down into the lower chamber G, and will be arrested and retained by the lower perforated diaphragm and the hay above it, which the oil clings. The construction of this chamber is such that we are enabled to withdraw this oil from the surface of the water within the chamber G by a skimming action, because when the cock K is opened, the funnel shape of the chamber causes a central downward draft from the upper surface, and the discharge takes place from the surface in the same manner as from an ordinary funnel. The oily deposit will thus be drawn down and discharged at the same time with the heavier sedimentary deposits. The hay which fills the filtering chambers offers sufficient obstruction to prevent any essential back flow of water from the clear water chamber, when the discharge cock K is opened, this cock being sufficiently large to discharge the oil and sediment very rapidly. If desired the oil may be drawn from the surface by an independent pipe P opening at the surface level, and having a controlling cock Q, and the sediment discharged through the cock K; but with the funnel construction, both the surface and sedimentary impurities can be discharged at a single operation.

Having thus described our invention, what we claim as new, and desire to secure by Letters Patent, is—

1. In a filter and purifier for boiler feed water, a means for separating both light and heavy impurities from the feed water, consisting of a funnel shaped chamber into which the previously heated water is delivered before passing through superposed filters which occupy the chamber from side wall to side wall, said funnel having a discharge opening and controlling cock at the apex, whereby the heavy impurities are discharged directly, and a central draft is produced from the surface to withdraw the oil and lighter impurities simultaneously.

2. A mud and oil trap and water purifier and heater consisting of a chamber having a water inlet pipe at the top, a series of oppositely inclined diaphragms fixed within said chamber, so that water is received upon the upper and delivered so as to flow alternately across it and the succeeding diaphragms, a pipe through which exhaust steam from the engine is delivered into said chamber below the lowermost inclined diaphragm and a steam discharge pipe above the uppermost diaphragm, a water pipe leading from the bottom of said chamber, a funnel-shaped receiving chamber at the bottom of the apparatus into which the water is delivered by said pipe from the upper chamber, perforated diaphragms above the receiving chamber and traversing the same from side wall to side wall and filtering material contained within the chambers between said diaphragms, a clear water chamber above the uppermost of the perforated diaphragms, and a pipe leading therefrom by which the boiler is supplied, a discharge pipe at the bottom of the funnel shaped receiving chamber with a controlling cock whereby the oil and heavy deposits are simultaneously discharged from said chamber whenever the cock is opened, substantially as herein described.

3. A mud and oil trap and water purifier consisting of a chamber having its lower end made funnel-shaped and having diaphragms near its upper and lower ends to form independent chambers, perforated diaphragms C in the main chamber between the upper and lower diaphragms forming chambers to contain a filtering medium, a water pipe entering the upper chamber, a series of alternately disposed inclined plates below the level of the water pipe for directing the water alternately across the chamber, a steam pipe passing through the filtering chamber and entering the uppermost chamber at a point below the lower inclined diaphragm whereby steam is caused to pass upwardly over said plates and the thin sheet of water passing downwardly over them, a pipe F at or near the lower level of the upper chamber leading to the lowermost chamber, a steam escape pipe at the upper end of the main chamber, a pipe leading from the filtered water chamber, and a sediment discharge pipe and cock at the bottom or funnel-shaped end of the main chamber, substantially as herein described.

In witness whereof we have hereunto set our hands.

GEORGE F. DAY.
WILLIAM HUNTER.

Witnesses:
LEE D. CRAIG,
WALTER R. CRAIG.